(12) United States Patent
Jiang et al.

(10) Patent No.: US 11,326,450 B2
(45) Date of Patent: May 10, 2022

(54) INTELLIGENT PREDICTION METHOD AND APPARATUS FOR RESERVOIR SENSITIVITY

(71) Applicant: China University of Petroleum (Beijing), Beijing (CN)

(72) Inventors: Guancheng Jiang, Beijing (CN); Xiongjun Wu, Beijing (CN); Lili Yang, Beijing (CN); Yinbo He, Beijing (CN); Tengfei Dong, Beijing (CN); Xiaohu Quan, Beijing (CN); Chunyao Peng, Beijing (CN); Xuwu Luo, Beijing (CN); Bin Tan, Beijing (CN); Jun Cai, Beijing (CN); Xing Liang, Beijing (CN); Zhiliang You, Beijing (CN); Yong Wang, Beijing (CN); Bin Li, Beijing (CN); Yongbin Guo, Beijing (CN); Shen Guan, Beijing (CN)

(73) Assignee: China University of Petroleum (Beijing), Beijing (CN)

( * ) Notice: Subject to any disclaimer, the term of this patent is extended or adjusted under 35 U.S.C. 154(b) by 0 days.

(21) Appl. No.: 17/345,904

(22) Filed: Jun. 11, 2021

(65) Prior Publication Data

US 2021/0388720 A1    Dec. 16, 2021

(30) Foreign Application Priority Data

Jun. 11, 2020    (CN) .......................... 202010531272.X
Jun. 11, 2020    (CN) .......................... 202010531296.5

(51) Int. Cl.
*G06N 3/08*    (2006.01)
*G01V 99/00*    (2009.01)
(Continued)

(52) U.S. Cl.
CPC .......... *E21B 49/087* (2013.01); *E21B 47/003* (2020.05); *E21B 49/00* (2013.01);
(Continued)

(58) Field of Classification Search
CPC .... E21B 49/087; E21B 47/003; E21B 49/003; E21B 43/00; E21B 43/16; E21B 2200/22;
(Continued)

(56) References Cited

U.S. PATENT DOCUMENTS

2003/0220775 A1*  11/2003  Jourdan ................... G01V 1/30
                                                                              703/2
2010/0018719 A1    1/2010  Lu et al.

FOREIGN PATENT DOCUMENTS

CN    102639812 A    8/2012
CN    103135135 A    6/2013
(Continued)

OTHER PUBLICATIONS

Wu, Xiong-Jun, et al. "Prediction of reservoir sensitivity using RBF neural network with trainable radial basis function." Neural Computing and Applications 22.5 (2013). pp. 947-953. (Year: 2013).*

(Continued)

*Primary Examiner* — Kamini S Shah
*Assistant Examiner* — John E Johansen
(74) *Attorney, Agent, or Firm* — Calfee Halter & Griswold LLP (57) ABSTRACT

The embodiments of the invention provide an intelligent prediction method and apparatus for reservoir sensitivity, belonging to the technical field of reservoir sensitivity prediction. The method includes: acquiring a reservoir sensitivity influence factor item related to a reservoir sensitivity result to be predicted and numerical values of corresponding reservoir sensitivity influence factors; determining a corresponding type of database according to the reservoir sensi- (Continued)

tivity influence factor item; determining whether numerical values of reservoir sensitivity influence factors corresponding to core parameters in the numerical values of the reservoir sensitivity influence factors include a first upper boundary value or a first lower boundary value; and using, according to whether the first upper boundary value or the first lower boundary value is included, different intelligent sensitivity prediction models to calculate the reservoir sensitivity result to be predicted.

18 Claims, 3 Drawing Sheets

(51) Int. Cl.
E21B 49/08 (2006.01)
E21B 49/00 (2006.01)
E21B 47/003 (2012.01)
G06N 3/04 (2006.01)
G06Q 10/04 (2012.01)
G06Q 50/02 (2012.01)
G01V 1/28 (2006.01)
G06Q 10/06 (2012.01)
E21B 43/00 (2006.01)
G06F 7/60 (2006.01)
E21B 43/16 (2006.01)
E21B 41/00 (2006.01)

(52) U.S. Cl.
CPC ......... *E21B 49/003* (2013.01); *G06N 3/0481* (2013.01); *G06N 3/08* (2013.01); *E21B 41/00* (2013.01); *E21B 43/00* (2013.01); *E21B 43/16* (2013.01); *E21B 2200/22* (2020.05); *G01V 1/28* (2013.01); *G01V 99/005* (2013.01); *G01V 2210/66* (2013.01); *G06F 7/60* (2013.01); *G06Q 10/04* (2013.01); *G06Q 10/06* (2013.01); *G06Q 50/02* (2013.01)

(58) Field of Classification Search
CPC ........... E21B 49/00; E21B 41/00; G06N 3/08; G06N 3/0481; G01V 1/28; G01V 99/005; G01V 2210/66; G06F 7/60; G06Q 10/04; G06Q 10/06; G06Q 50/02
USPC .......................................................... 703/10
See application file for complete search history.

(56) References Cited

FOREIGN PATENT DOCUMENTS

| | | | |
|---|---|---|---|
| CN | 104732359 | A | 6/2015 |
| CN | 105069303 | A | 11/2015 |
| CN | 106126936 | A | 11/2016 |
| CN | 106530108 | A | 3/2017 |
| CN | 107301306 | A | 10/2017 |
| CN | 108897906 | A | 11/2018 |
| CN | 109636094 | A | 4/2019 |
| CN | 110009150 | A | 7/2019 |

OTHER PUBLICATIONS

Ahmed, Kamal, Shamsuddin Shahid, and Sobri Harun. "Statistical downscaling of rainfall in an arid coastal region: A radial basis function neural network approach." Applied mechanics and materials. vol. 735. Trans Tech Publications Ltd, 2015. pp. 190-194. (Year: 2015).*
Sun, Yu-Xue, and Guang-Hui Guo. "Application of artificial neural network on prediction reservoir sensitivity." 2005 International Conference on Machine Learning and Cybernetics. vol. 8. IEEE, 2005. p. 4770-4773. (Year: 2005).*
Jiang, Guancheng, et al., "Application of Pattern Recognition in Prediction of Reservoir Sensitivity," Petroleum Geology and Recovery Efficiency, vol. 17, No. 5, Sep. 2010.
Yu, Zhihua, et al., "Indicative Factors of Reservoir Sensitivity Based on Pre-stack Inversion," journal of Engineering Science and Technology Review, 11(4), 2018, 101-110.
Wu, Xiongjun, et al., "Optimization of Radial Basis Function Neural Network and Application in Quantitative Reservoir Sensitivity Prediction," Petroleum Geology and Recovery Efficiency, vol. 19, No. 1, Jan. 2012.
Jiang, Guancheng, et al., "Research on a New Method for Forecasting Reservoir Sensitivity," Comput Simul 28.9 2011, 322-326.
Gudmundsdottir, Halldora, and Roland N. Horne, "Reservoir characterization and prediction modeling using statistical techniques," Dimension (xyz), 1000, 2018.
Search Report of 202010531272.X dated Jan. 13, 2021.
Search Report of 202010531296.5 dated Jan. 13, 2021.
Civan, Reservoir Formation Damage (Second Edition, 2007); Table of Contents provided. 20 pages (cover pages and pp. vii-xx).
Bing et al., Minimize Formation Damage in Water-Sensitive Montney Formation with Energized Fracturing Fluid, SPE Res Eval & Eng 20 (2017): 562-571.

* cited by examiner

INTELLIGENT PREDICTION METHOD AND APPARATUS FOR RESERVOIR SENSITIVITY

CROSS REFERENCE TO RELATED APPLICATIONS

This application claims priorities to Chinese Application No. 202010531296.5, filed on Jun. 11, 2020, entitled "INTELLIGENT PREDICTION METHOD AND APPARATUS FOR RESERVOIR SENSITIVITY" and Chinese Application No. 202010531272.X, filed on Jun. 11, 2020, entitled "INTELLIGENT PREDICTION DATA PROCESSING METHOD AND APPARATUS FOR RESERVOIR SENSITIVITY", which are specifically and entirely incorporated by reference.

FIELD OF THE INVENTION

The present invention relates to the technical field of reservoir sensitivity prediction, and particularly relates to an intelligent prediction method and apparatus for reservoir sensitivity.

BACKGROUND OF THE INVENTION

Reservoir sensitivity refers to a nature that various physical or chemical interactions between oil and gas reservoirs and external fluids change original pore structures and permeability of the reservoirs. When a reservoir interacts with an external fluid, the reservoir permeability tends to deteriorate and damage the oil and gas reservoir to varying degrees, resulting in a loss of productivity or a decline in throughput. Therefore, the reservoir sensitivity can also be understood as the degree of sensitivity of the reservoir to various types of reservoir damages.

Reservoir sensitivity prediction is an important basis for scientifically formulating reservoir protection plans and efficiently and reasonably exploiting oil and gas resources. Thanks to the rapid development of a reservoir evaluation technology and a computer technology, reservoir protection researchers have established a variety of methods for reservoir sensitivity prediction, but the established methods have certain limitations.

SUMMARY OF THE INVENTION

Purposes of the embodiments of the present invention are to provide an intelligent prediction method and apparatus for reservoir sensitivity, which can effectively improve the accuracy and range of application of the intelligent prediction method for reservoir sensitivity to provide an accurate basis for formulation of reservoir protection measures and enhance the reservoir protection effect.

In order to achieve the above purposes, the embodiments of the present invention provide an intelligent prediction method for reservoir sensitivity, comprising: acquiring a reservoir sensitivity influence factor item related to a reservoir sensitivity result to be predicted and numerical values of corresponding reservoir sensitivity influence factors; determining a corresponding type of database according to the reservoir sensitivity influence factor item; determining whether numerical values of reservoir sensitivity influence factors corresponding to core parameters in the numerical values of the reservoir sensitivity influence factors include a first upper boundary value or a first lower boundary value; calculating the reservoir sensitivity result to be predicted using an upper boundary database divided from the corresponding type of database as a sample according to an expert system method in the case that the first upper boundary value is included; calculating the reservoir sensitivity result to be predicted using a lower boundary database divided from the corresponding type of database as a sample according to the expert system method in the case that the first lower boundary value is included; and calculating the reservoir sensitivity result to be predicted using an intermediate database divided from the corresponding type of database as a sample according to an artificial neural network method in the case that the first upper boundary value and the first lower boundary value are not included.

Correspondingly, the embodiment of the present invention also provides an intelligent prediction apparatus for reservoir sensitivity, comprising a memory and a processor, wherein the memory stores instructions that are used to enable the processor to execute the following steps: acquiring a reservoir sensitivity influence factor item related to a reservoir sensitivity result to be predicted and numerical values of corresponding reservoir sensitivity influence factors; determining a corresponding type of database according to the reservoir sensitivity influence factor item; determining whether numerical values of reservoir sensitivity influence factors corresponding to core parameters in the numerical values of the reservoir sensitivity influence factors include a first upper boundary value or a first lower boundary value; calculating the reservoir sensitivity result to be predicted using an upper boundary database divided from the corresponding type of database as a sample according to an expert system method in the case that the first upper boundary value is included; calculating the reservoir sensitivity result to be predicted using a lower boundary database divided from the corresponding type of database as a sample according to the expert system method in the case that the first lower boundary value is included; and calculating the reservoir sensitivity result to be predicted using an intermediate database divided from the corresponding type of database as a sample according to an artificial neural network method in the case that the first upper boundary value and the first lower boundary value are not included.

Through the above technical solution, for situations where numerical values of reservoir sensitivity influence factors, corresponding to core parameters, in numerical values of reservoir sensitivity influence factors that are related to a reservoir sensitivity result to be predicted have boundary values and do not have boundary values, different methods are used to calculate the reservoir sensitivity result to be predicted, that is, different prediction methods are used for performing differentiated treatment according to a proximity degree between numerical values of influence factors of a sample to be predicted and the boundary value, thereby effectively improving the accuracy and the range of application of the intelligent prediction method for reservoir sensitivity, providing an accurate basis for formulation of reservoir protection measures and enhancing the reservoir protection effect.

Other features and advantages of the embodiments of the present invention will be described in detail in the following specific implementation modes.

BRIEF DESCRIPTION OF DRAWINGS

The accompanying drawings are used to provide a further understanding of the embodiments of the present invention, constitute a part of the description, are used to explain the embodiments of the present invention together with the following specific implementation modes, but do not constitute a limitation to the embodiments of the present invention. In the drawings.

DETAILED DESCRIPTION OF THE EMBODIMENTS

The specific implementation modes of the embodiments of the present invention are described in detail below with reference to the accompanying drawings. It should be understood that the specific implementation modes described herein are only used to illustrate and explain the embodiments of the present invention, and are not intended to limit the embodiments of the present invention.

At present, technologies for reservoir sensitivity prediction mainly include a multivariate statistical regression analysis method, a grey system theory method, an expert system method, a pattern recognition method and an artificial neural network method.

The multivariate statistical regression analysis method often uses nonlinear regression or stepwise regression. That is, it is first assumed that relations between reservoir constitutions and structural characteristic parameters and sensitivity conform to a certain mathematical model; then known reservoir experimental data is used to perform regression analysis on the model to find undetermined coefficients in the model, so as to obtain a regression equation that can reflect a quantitative relation between an independent variable and a dependent variable; and finally, reservoir constitutions and structural characteristic parameters of a sample to be predicted with unknown sensitivity are substituted into the obtained regression equation to determine the degree of sensitivity of the sample to be predicted. The advantages of the multivariate statistical regression analysis method for reservoir sensitivity prediction are that specific numerical values that reflect the degree of sensitivity damage can be obtained, and the impact of main factors on the reservoir sensitivity can be substantially learned through the obtained regression relation. It is first assumed that the relations between the reservoir constitutions and structural parameters and the sensitivity satisfy a certain mathematical model, so that if a different model is selected, the obtained regression relation and a prediction result are likely to be inconsistent. Therefore, this method is greatly affected by personal subjective factors, and especially when the selected model is not suitable, the sensitivity prediction results obtained are very likely to be far from an actual result.

The grey system theory method is a theoretical method that combines a system theory, an information theory and a fuzzy mathematics method to study the prediction, modeling and decision making of a grey system. The grey system theory is used to evaluate the reservoir sensitivity, which does not require a large number of samples and typical distribution rules, needs a small calculated amount, and is free from the presence of conclusions inconsistent with qualitative analysis. However, since the grey correlation degree is used to distinguish the intensity and type of sensitivity in the study process, there are still deficiencies that evaluation results are still low in distinguishability, evaluation values tend to be homogenized, and it is difficult to distinguish the difference between two levels.

The concept of an expert system was first proposed by Professor Feigenbaum of Stanford University in the 1970s. After decades of development, the expert system has become the most active branch in the field of artificial intelligence researches and has been widely used in various industries. Relevant researches have accumulated a certain theoretical basis and practical experience for the application of the expert system in reservoir sensitivity prediction. However, the current expert systems established still have difficulties in updating knowledge bases, cannot accurately express complex knowledge chains, etc., so that further optimization and improvement are still needed.

Pattern recognition refers to a process of processing and analyzing various forms of information that characterize objects or phenomena, so as to identify, describe, classify and explain the objects or phenomena. With the rapid development of computer software and hardware technologies, the method and means of pattern recognition are becoming more and more perfect, and are almost applied to the fields of subjects including geology, energy sources, meteorology, chemical engineering, metallurgy, aviation, etc. However, the prediction accuracy of the pattern recognition method excessively depends on the accuracy of feature extraction, and most of the established methods are directed at the same block with similar original data, and are less universal.

An artificial neural network is the most active and widely used branch of artificial intelligence researches, and has become the focus of common attention in many fields such as mathematics, physics, and neurology. Relevant researches on China's artificial neural network reservoir sensitivity prediction technologies began in the 1990s. By means of more than ten years of research, a certain technological progress has been made, but most of the established methods are limited to back propagation (BP) neural networks or improved BP neural networks, so that they still have problems that the convergence speed is low, network training easily falls into local minima, furthermore, the prediction accuracy is relatively low, and it is difficult to truly realize quantitative and efficient prediction for reservoir sensitivity.

In general, the various reservoir sensitivity prediction methods established at present have certain limitations, and cannot well achieve accurate and quantitative prediction for the reservoir sensitivity. It is mainly manifested in the following aspects: (1) the knowledge acquisition means of the existing reservoir sensitivity prediction methods is relatively monotonous, most of the existing reservoir sensitivity prediction methods only consider the difficulty of data acquisition and fail in accurately reflecting the degree of influence of different influence factors on reservoir sensitivity results when original data databases for prediction are established; (2) the existing reservoir sensitivity methods are mainly used for qualitative evaluation for reservoir sensitivity, and are low in accuracy of quantitative prediction for reservoir sensitivity; and (3) most of the existing reservoir sensitivity prediction methods are researched according to a single oil field or designated blocks, and research achievements obtained are difficultly popularized and applied.

Based on this, an embodiment of the present invention provides an intelligent prediction method for reservoir sensitivity to overcome the defects of various reservoir sensitivity prediction methods in the related technology.

Before the intelligent prediction method for reservoir sensitivity provided by the embodiment of the present invention is executed, an embodiment of the present invention further provides an intelligent prediction data processing method for reservoir sensitivity used for establishing a database that accurately reflects an internal relation between a reservoir sensitivity influence factor and a sensitivity result, thereby improving the accuracy of intelligent reservoir sensitivity prediction.

Reservoir sensitivity factors can be graded and classified in advance. There are many reservoir sensitivity influence factors, and the mutual influences of the reservoir sensitivity influence factors are intricate. In the case of sufficient original data sources, if a prediction method considers more influence factors, the relation between a reservoir sensitivity result and each factor can be reflected more objectively. However, in actual production, the focuses of test units for original data are different, and it is difficult to acquire all the influence factor values at the same time. At present, data used by commonly used intelligent sensitivity prediction methods are mostly from main research units or testing departments of different oilfield enterprises. Since the concerns of the units in an actual testing process are not completely the same, a great variety of reservoir sensitivity influence factors are often present during data summarization, but data is not complete. As a result, in the process of establishing databases, some reliable data that is useful for intelligent prediction or original data with complete main influence factors have to be discarded because of incomplete data, or established databases involve insufficient influence factors, which will eventually lead to low accuracy or limited range of application of the established intelligent reservoir sensitivity prediction method. Therefore, it is necessary to grade and classify the reservoir sensitivity influence factors.

The embodiment of the present invention proposes sorting the reservoir sensitivity influence factors according to their importance in combination with a consensus of field experts, a single-factor comparative evaluation experimental result, a comprehensive factor comparative analysis conclusion and comparative analysis of approximate original data, and establishing an original data database for intelligent prediction for reservoir sensitivity in combination with the completeness of the collected original data. If the collected original data of the influence factors is complete, values of influence factors are included in accordance with the order of importance as many as possible in the establishing process of the original data databases to improve the accuracy of intelligent prediction. If the collected influence factors are not complete, influence factors can be selected according to the order of importance to enlarge the range of application of the intelligent prediction method.

It is verified that the order of importance of the influence factors of different reservoir sensitivities is as follows.

(1) Water sensitivity influence factors: total content of clay minerals, relative content of smectite, relative content of an illite-smectite mixed layer, formation water salinity, formation cementation type, permeability, porosity, shale content, content of a chlorite-smectite mixed layer, illite content, chlorite content, linear expansion rate of rock, kaolinite content, particle sorting property, particle average value, cation exchange capacity, carbonate content, quartz content, pore-throat radius of formation, etc.

(2) Velocity sensitivity influence factors: porosity, permeability, pore type, cementation type, total content of clay minerals, kaolinite content, particle sorting property, formation water salinity, illite content, chlorite content, pore-throat radius of formation, content of a chlorite-smectite mixed layer, smectite content, content of an illite-smectite mixed layer, shale content, carbonate content, quartz content, feldspar content, formation temperature, formation pressure, calcite content, crude oil viscosity, mica content, amorphous silicon content, occurrence of sensitive minerals, etc.

(3) Acid sensitivity influence factors: total content of clay minerals, chlorite content, content of a chlorite-smectite mixed layer, quartz content, cement content, cementation type, particle sorting property, porosity, permeability, illite content, content of an illite-smectite mixed layer, smectite content, kaolinite content, feldspar content, ferrocalcite content, occurrence of sensitive minerals, pyrite, colloid+asphaltene content, H2S, ferrodolomite content, hematite content, siderite content, hydrobiotite content, hydrochloric acid dissolution rate, soil acid dissolution rate, $K^++Na^+$ ion content, $Ca^{2+}$ ion content, $Mg^{2+}$ ion content, etc.

(4) Alkali sensitivity influence factors: formation water pH value, particle sorting property, formation water salinity, $Ca^{2+}$ ion content, $Mg^{2+}$ ion content, cementation type, total content of clay minerals, porosity, permeability, illite content, smectite content, kaolinite content, quartz content, content of an illite-smectite mixed layer, content of a chlorite-smectite mixed layer, chlorite content, feldspar content, opal content, carbonate content, $K^++Na^+$ ion content, $Cl^-$ ion content, dolomite content, gypsum content, occurrence of sensitive minerals, formation temperature, etc.

After the reservoir sensitivity influence factors are sorted according to their importance, the reservoir sensitivity influence factors can be further classified into three categories: core parameters, important parameters and auxiliary parameters according to different sensitivities.

Core parameters refer to influence parameters that are indispensable for intelligent prediction for reservoir sensitivity, that is, the core parameters are parameters that can directly and obviously affect reservoir sensitivity results if the sizes of such parameters are changed. Ways to determine such parameters include, but are not limited to: consensus of field experts, a single-factor comparative evaluation experimental result, a comprehensive factor comparative analysis conclusion, comparative analysis of approximate original data, and the like.

Important parameters are parameters that can have a certain influence on the reservoir sensitivity results based on the current level of recognition and the recognition of field industry experts, but have low degree of influence and an unclear influence rule. The introduction of such parameters can effectively improve the accuracy and range of application of the intelligent prediction method for reservoir sensitivity. Ways to determine such parameters include, but are not limited to consensus of industry experts, a single-factor comparative evaluation experimental result, a comprehensive factor comparative analysis conclusion, comparative analysis of approximate original data, and the like.

Auxiliary parameters are parameters that can have a slight influence on the reservoir sensitivity results based on the current level of recognition and the recognition of industry experts, but have an unclear influence rule. Most of such parameters are difference data of different oil fields or regions. Ways to determine the parameters include, but are not limited to: consensus of industry experts, a single-factor comparative evaluation experimental result, a comprehensive factor comparative analysis conclusion, comparative analysis of approximate original data, and the like.

Water sensitivity is taken as an example, and factors influencing the water sensitivity are graded and classified as follows:

core parameters: total content of clay minerals, relative content of smectite, relative content of an illite-smectite mixed layer, formation water salinity, permeability, porosity, and formation cementation type;

important parameters: shale content, pore type, content of a chlorite-smectite mixed layer, quartz content, kaolinite content, chlorite content, and illite content; and auxiliary parameters: particle sorting property, feldspar content, pH value of formation fluid, calcite content, formation temperature, formation pressure, etc.

In addition to grading and classification for the reservoir sensitivity factors, it is also necessary to collect original data of reservoir sensitivity influence factors. Reservoir sensitivity data of different oil regions is collected in a classification manner. Methods for classified collection of the original data of the reservoir sensitivity influence factors include, but are not limited to: collection according to different formation types; collection according to different oil fields and operating blocks; and integrated collection as a whole, wherein the integrated collection as a whole refers to comprehensive collection for known reservoir sensitivity results and corresponding influence factors thereof according to the three types of parameters: the core parameters, the important parameters and the auxiliary parameters.

The collection according to different formation types is to collect the original data of reservoir sensitivity according to different formation conditions. The types of formations include, but are not limited to, shale, sandstone, glutenite, carbonate rock, clastic rock, igneous rock, etc. This collection method can improve the contrast of the original data and facilitate the demonstration of the understanding of the existing regularity. A database formed by this collection method can further improve the accuracy of a numerical simulation method based on a mathematical model. Meanwhile, this collection method can also be used for updating and correcting conclusions of intelligent prediction methods such as inversion calculation and expert systems in which reservoir sensitivity results are known and original data of some influence factors are missing.

The collection according to different oil fields and operating blocks is to collect original data of reservoir sensitivity according to different oil fields or major blocks of various oil fields. In China, for example, division of oil fields includes, but is not limited to, Shengli Oil Field, Dagang Oil Field, Liaohe Oil Field, etc. Division of the operating blocks is in accordance with different operating blocks of the oil fields. The data obtained by this collection method comes from independent units or departments managed in a unified mode. The original data is more consistent and standardized, and is mainly used for establishing regional intelligent prediction methods. Such collection is suitable for intelligent prediction methods for reservoir sensitivity based on the expert system method and the pattern recognition method, which is beneficial to expanding the original data volume of an intelligent reservoir sensitivity prediction database and increasing the universality of the prediction method.

The integrated collection as a whole refers to comprehensive collection for known reservoir sensitivity results and their corresponding influence factors according to the three types of parameters: the core parameters, the important parameters and the auxiliary parameters. The data collected by this collection method is extensive, but the regularity is not clear. Such collection is suitable for using machine learning methods such as the grey system method and the artificial neural network method to better get closer to fuzzy relations between reservoir sensitivity results and various influence factors under the condition of sufficient original data, thereby improving the accuracy and the range of application of prediction.

Reservoir sensitivity data collected in the classified manner is historical data. Each piece of data can include a reservoir sensitivity influence factor item, numerical values of reservoir sensitivity influence factors, and a reservoir sensitivity result. The collected reservoir sensitivity data can be used to establish databases.

Due to different concerns of various regions, the reservoir sensitivity influence factor items are also different. Therefore, different databases can be established based on the core parameters, the important parameters, and the auxiliary parameters. For example, the established databases can include: a first database including all the core parameters; a second database including all the core parameters and at least a part of important parameters; and a third database including all the core parameters, all the important parameters, and at least a part of auxiliary parameters. For five reservoir sensitivities such as water sensitivity, velocity sensitivity, alkali sensitivity, acid sensitivity, and stress sensitivity, the above three databases can be established respectively. Preferably, the second database may include all the core parameters and all the important parameters, and the third database may include all the core parameters, all the important parameters, and all the auxiliary parameters. The number of the reservoir sensitivity influence factor items in each database is fixed. Preferably, the numerical values of the reservoir sensitivity influence factor items can be normalized and then stored in the databases.

Since the various reservoir sensitivity influence factors include qualitative data (such as formation lithology and cementation type), and quantitative data (such as porosity, permeability and the content of clay minerals), and the valuing ranges of the factors in the quantitative data are quite different (for example, the porosity values 0-100%, the permeability values 0–$\infty$, and the ion content values 0–$\infty$). If the quantitative data is directly included in the databases without processing, problems that the qualitative data cannot be recognized and the importance of the quantitative data cannot be reflected may occur.

The embodiment of the present invention proposes that the qualitative data are subjected to normalization by adopting multi-expert assignment and weighted averaging; and for the quantitative data, a numerical value corresponding to a factor is divided by the maximum value of the factor in the database to enable the valuing range to be between 0 and 1, which facilitates that the valuing ranges of factors for intelligent prediction for reservoir sensitivity are in the same range and reflects the importance of the various data in the same group of samples to the greatest extent, thereby improving the accuracy of intelligent prediction for reservoir. Of course, the way for the normalization is not limited to the above method, and any other appropriate normalization methods may also be used.

The cementation type is taken as an example to illustrate the quantitative processing for the qualitative data: according to identification standards of rocks and minerals, standard cementation types can be divided into eight types: a base type, a thin film type, weak cementation type, pore type, contact type, clot type, regeneration type, and compression type. There may be two or more cementation types in the same reservoir rock, which can be described by compound nomenclature, such as pore-contact type cementation, base-contact type cementation and pore-base cementation. For different reservoir sensitivities, the degrees of influence of the cementation types are inconsistent, so that it is necessary to carry out differentiated assignments on different reservoir sensitivities. Expert assignment processing results of different cementation types are as shown in Table 1 below.

TABLE 1

Expert assignment processing results of cementation types for intelligent prediction for different sensitivities

| | Water sensitivity | Velocity sensitivity | Alkali sensitivity | Acid sensitivity |
|---|---|---|---|---|
| Standard cementation type | | | | |
| Base type | 0.6521 | 0.5681 | 0.4369 | 0.2146 |
| Thin film type | 0.1357 | 0.5369 | 0.7619 | 0.3553 |
| Weak cementation type | 0.0985 | 0.1267 | 0.8826 | 0.6156 |
| Pore type | 0.6317 | 0.2285 | 0.4617 | 0.2467 |
| Contact type | 0.3652 | 0.6517 | 0.5936 | 0.5627 |
| Clot type | 0.7468 | 0.6938 | 0.8816 | 0.6615 |
| Regeneration type | 0.8126 | 0.7456 | 0.3927 | 0.4795 |
| Compression type | 0.9365 | 0.7816 | 0.3672 | 0.4336 |
| Combined cementation type | | | | |
| Thin film-pore | 0.3838 | 0.3339 | 0.6575 | 0.5879 |
| Compression-clot | 0.8993 | 0.6799 | 0.5888 | 0.6395 |
| Contact-pore | 0.7613 | 0.3816 | 0.4315 | 0.7612 |
| Base-pore | 0.3825 | 0.5719 | 0.5527 | 0.3558 |
| Contact-base | 0.5451 | 0.6271 | 0.6637 | 0.6689 |
| Pore-base | 0.8168 | 0.5369 | 0.8068 | 0.7396 |
| Pore-contact | 0.4261 | 0.9177 | 0.6677 | 0.4591 |
| Base-contact | 0.3856 | 0.5715 | 0.2419 | 0.4448 |

The first database, the second database, or the third database can be used for inversion calculation in the process of collecting reservoir sensitivity data. Specifically, in the case that new reservoir sensitivity data is collected, if a reservoir sensitivity result in the new reservoir sensitivity data is known and one reservoir sensitivity influence factor is missing relative to one of the first database, the second database and the third database, one of the first database, the second database and the third database is used to perform inversion calculation to calculate a numerical value of the missing reservoir sensitivity influence factor, wherein the numerical value of the missing reservoir sensitivity influence factor obtained by inversion calculation, the numerical value of the new reservoir sensitivity influence factor and the new reservoir sensitivity result are stored in the corresponding one of the first database, the second database and the third database as one piece of new reservoir sensitivity data. This process will be described in detail below with reference to FIG. 1.

Figure 1:
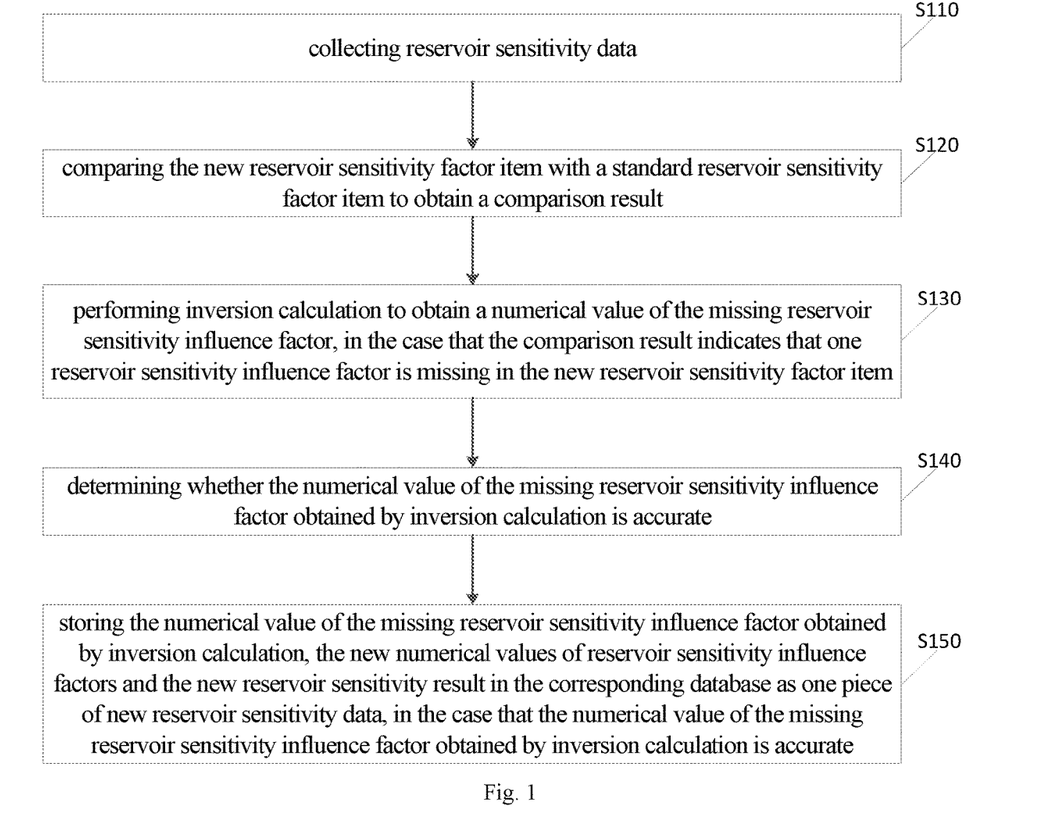
FIG. 1 illustrates a flow diagram of an intelligent prediction data processing method for reservoir sensitivity according to an embodiment of the present invention.

FIG. 1 illustrates a flow diagram of an intelligent prediction data processing method for reservoir sensitivity according to an embodiment of the present invention. As shown in FIG. 1, an embodiment of the present invention provides the intelligent prediction data processing method for reservoir sensitivity. The method can include the following steps.

Step S110, reservoir sensitivity data is collected, wherein the reservoir sensitivity data includes a new reservoir sensitivity influence factor item, new numerical values of reservoir sensitivity influence factors and a new reservoir sensitivity result.

Step S120, the new reservoir sensitivity factor item is compared with a standard reservoir sensitivity factor item to obtain a comparison result.

The standard reservoir sensitivity factor item here refers to a fixed reservoir sensitivity factor item in a database.

Optionally, after execution of the step S110 and before execution of the step S120, the numerical values of the new reservoir sensitivity influence factors are subjected to normalization. For qualitative data, multi-expert assignment and weighted averaging are used to perform the normalization; and for quantitative data, the numerical value corresponding to the factor is divided by a maximum value of the factor in the database to enable a valuing range to be between 0 and 1.

Step S130, in the case that the comparison result indicates that one reservoir sensitivity influence factor is missing in the new reservoir sensitivity factor item, inversion calculation is performed to obtain a numerical value of the missing reservoir sensitivity influence factor.

The new reservoir sensitivity factor item can be compared with fixed reservoir sensitivity factor items of databases respectively to determine whether one reservoir sensitivity influence factor is missing for the fixed reservoir sensitivity factor item of a certain database. This piece of reservoir sensitivity data cannot be considered if more than one factor item is missing relative to the standard reservoir sensitivity factor item. This piece of reservoir sensitivity data can be directly added into the database if no factor item is missing.

The used inversion calculation method includes, but is not limited to, an artificial neural network method, and other reservoir sensitivity prediction models established according to corresponding databases can also be used. The artificial neural network method can be established according to the corresponding databases. When the reservoir sensitivity result in the collected data is known and the numerical value of a certain influence factor is unknown, a self-learning function of the artificial neural network method is used to perform inversion calculation by taking the numerical value of the certain influence factor as an output and taking the reservoir sensitivity result and the numerical values of other influence factors as inputs, so as to obtain an inversion numerical value of the certain influence factor. The artificial neural network method is an artificial neural network method established by using the corresponding databases. The establishment of the artificial neural network method can refer to the paper "Optimization of Radial Basis Function Neural Network and Application in Quantitative Reservoir Sensitivity Prediction" published in 2012 by Wu Xiongjun, Jiang Guancheng, Zhao Lin, et al, which is not described in detail here.

Step S140, whether the numerical value of the missing reservoir sensitivity influence factor obtained by inversion calculation is accurate is determined.

Specifically, a first reservoir sensitivity result is obtained according to a first reservoir sensitivity prediction model generated by using a database that does not include the new reservoir sensitivity data as a sample, and numerical values of tested reservoir sensitivity factors; a second reservoir sensitivity result is obtained according to a second reservoir sensitivity prediction model generated by using the database that includes the new reservoir sensitivity data as a sample, and the numerical values of the tested reservoir sensitivity factors; a first prediction accuracy of the first reservoir sensitivity result compared to an actual reservoir sensitivity result corresponding to the numerical values of the tested reservoir sensitivity factors is calculated; a second prediction accuracy of the second reservoir sensitivity result compared to the actual reservoir sensitivity result corresponding to the numerical values of the tested reservoir sensitivity factors is calculated; and it is determined that the numerical value of the missing reservoir sensitivity influence factor is accurate in the case that an absolute value of a difference value between the second prediction accuracy and the first prediction accuracy is not greater than a preset value.

The first reservoir sensitivity prediction model and the second reservoir sensitivity prediction model can be artificial neural network methods. The numerical value of the tested reservoir sensitivity factor and its reservoir sensitivity result are both known values. The prediction accuracy can be, for example, a numerical value obtained by dividing the difference value between the predicted reservoir sensitivity result and the actual reservoir sensitivity result by the actual reservoir sensitivity result. If the absolute value of the difference value between the second prediction accuracy and the first prediction accuracy is not greater than the preset value, it indicates that the prediction accuracy of the second reservoir sensitivity prediction model generated by using the database that includes the piece of new reservoir sensitivity data as the sample is relatively high, and it can be determined that the numerical value of the missing reservoir sensitivity influence factor is accurate, otherwise, it can be determined that the numerical value of the missing reservoir sensitivity influence factor is inaccurate.

Optionally, the accuracy of the numerical value of the missing reservoir sensitivity influence factor can be comprehensively determined by using the numerical values of multiple tested reservoir sensitivity factors and reservoir sensitivity results thereof.

Optionally, adjustment is performed by adjusting a radial basis function, a spreading constant and the like of the artificial neural network method in the case that the reservoir sensitivity prediction model is a radial basis function neural network optimization method. The adjusted artificial neural network method is used to perform inversion calculation again to obtain the numerical value of the missing reservoir sensitivity influence factor, and its accuracy is redetermined.

Optionally, in addition to use of the accuracy, it can also be determined that the numerical value of the missing reservoir sensitivity influence factor is accurate in the case that the second reservoir sensitivity result is closer to the actual reservoir sensitivity result corresponding to the numerical value of the tested reservoir sensitivity factor than the first reservoir sensitivity result. In this way, the prediction accuracy of the reservoir sensitivity prediction model generated based on the database can be improved after the numerical value of the missing reservoir sensitivity influence factor obtained by inversion calculation, the numerical value of the new reservoir sensitivity influence factor and the new reservoir sensitivity result are stored in the corresponding database as one piece of new reservoir sensitivity data.

Step S150, the numerical value of the missing reservoir sensitivity influence factor obtained by inversion calculation, the numerical value of the new reservoir sensitivity influence factor and the new reservoir sensitivity result are stored in the corresponding database as one piece of new reservoir sensitivity data in the case that the numerical value of the missing reservoir sensitivity influence factor obtained by inversion calculation is accurate.

For example, the numerical value of the missing reservoir sensitivity influence factor obtained by inversion calculation, the numerical value of the new reservoir sensitivity influence factor and the new reservoir sensitivity result are stored in the first database as one piece of new reservoir sensitivity data if the numerical value of the missing reservoir sensitivity influence factor is obtained by inversion calculation according to the first database, are stored in the second database if the numerical value of the missing reservoir sensitivity influence factor is obtained by inversion calculation according to the second database, and are stored in the third database if the numerical value of the missing reservoir sensitivity influence factor is obtained by inversion calculation according to the third database.

In the case that one reservoir sensitivity influence factor is missing by comparison between the new reservoir sensitivity factor item in newly collected reservoir sensitivity data and the standard reservoir sensitivity factor item, the numerical value of the missing reservoir sensitivity influence factor is obtained by inversion calculation, and the accuracy of the numerical value is estimated. If the numerical value is accurate, the numerical value of the missing reservoir sensitivity influence factor obtained by inversion calculation, the numerical value of the new reservoir sensitivity influence factor and the new reservoir sensitivity result are stored in the corresponding database as one piece of new reservoir sensitivity data. By means of inversion calculation, sample distribution of the whole database can be increased, and the accuracy of intelligent reservoir sensitivity prediction can be improved.

Further, the intelligent prediction data processing method for reservoir sensitivity provided by the embodiment of the present invention may further include that one piece of specific reservoir sensitivity data in the database is tested, and the piece of specific reservoir sensitivity data is any one piece of reservoir sensitivity data in the database. That is, any one piece of reservoir sensitivity data in the database can be tested.

Specifically, a third reservoir sensitivity result is obtained according to a third reservoir sensitivity prediction model generated by using a database that does not include the piece of specific reservoir sensitivity data as a sample, and the numerical value of the tested reservoir sensitivity factor; a fourth reservoir sensitivity result is obtained according to a fourth reservoir sensitivity prediction model generated by using a database that includes the piece of specific reservoir sensitivity data as a sample, and the numerical value of the tested reservoir sensitivity factor; a third prediction accuracy of the third reservoir sensitivity result compared to the actual reservoir sensitivity result corresponding to the numerical value of the tested reservoir sensitivity factor is calculated; a fourth prediction accuracy of the fourth reservoir sensitivity result compared to the actual reservoir sensitivity result corresponding to the numerical value of the tested reservoir sensitivity factor is calculated; in the case that an absolute value of a difference value between the third prediction accuracy and the fourth prediction accuracy is greater than a preset value, it is determined that the specific reservoir sensitivity data is abnormal, and the specific reservoir sensitivity data is deleted; and in the case that the absolute value of the difference value between the third prediction accuracy and the fourth prediction accuracy is not greater than the preset value, it is determined that the specific reservoir sensitivity data is normal. The preset value can be any appropriate value, which is not specifically limited by the embodiments of the present invention.

The third reservoir sensitivity prediction model and the fourth reservoir sensitivity prediction model can be artificial neural network methods. The numerical value of the tested reservoir sensitivity factor and its reservoir sensitivity result are both known values. The prediction accuracy can be, for example, a numerical value obtained by dividing the difference value between the predicted reservoir sensitivity result and the actual reservoir sensitivity result by the actual reservoir sensitivity result. If the absolute value of the difference value between the third prediction accuracy and the fourth prediction accuracy is not greater than the preset value, it indicates that the prediction accuracy of the fourth reservoir sensitivity prediction model generated by taking the database that includes the piece of specific reservoir sensitivity data as the sample is relatively high, and it can be determined that the piece of specific reservoir sensitivity data is normal, otherwise, it is determined that the piece of specific reservoir sensitivity data is abnormal and needs to be deleted to avoid adverse influence of the abnormal data on a final prediction result.

The intelligent prediction data processing method for reservoir sensitivity provided by the embodiment of the present invention has the following advantages.

(1) By means of grading and classification for the reservoir sensitivity influence factors, the applicability of the databases for intelligent reservoir sensitivity prediction is improved, and it is favorable for establishing the databases for implementing intelligent prediction in case of insufficient acquisition of the original data.

(2) By means of classified collection of the original data of the reservoir sensitivity influence factors, the accuracy and the range of application of the intelligent prediction method for different types of reservoir sensitivities are improved in a targeted manner.

(3) By means of inversion calculation and supplementation for the original data of the reservoir sensitivity influence factors, the sample distribution of the whole database is increased, so that the accuracy of various types of intelligent prediction methods is improved.

(4) By means of testing, screening and normalizing the data in the databases, the reasonability of the databases is improved, and the importance of the reservoir sensitivity influence factors is definite, thereby improving the sensitivity prediction accuracy.

Specific establishing modes for the first database, the second database and the third database are described above. When the databases are used to perform intelligent prediction for reservoir sensitivity, a corresponding database can be selected according to a reservoir sensitivity influence factor item to be predicted to perform prediction. For example, the first database can be used to predict the reservoir sensitivity if the reservoir sensitivity influence factor item to be predicted only includes all the core parameters. In order to further improve the intelligent prediction accuracy, the embodiments of the present invention further propose performing further division on the first database, the second database and the third database according to boundary values.

Specifically, the databases can be further divided according to ranges of the reservoir sensitivity results in the databases. The first database can be further divided into a first upper boundary database including reservoir sensitivity data with the reservoir sensitivity result located at an upper boundary, a first intermediate database including reservoir sensitivity data with the reservoir sensitivity result located at an intermediate value, and a first lower boundary database including reservoir sensitivity data with the reservoir sensitivity result located at a lower boundary. The second database can be further divided into a second upper boundary database including reservoir sensitivity data with the reservoir sensitivity result located at an upper boundary, a second intermediate database including reservoir sensitivity data with the reservoir sensitivity result located at an intermediate value, and a second lower boundary database including reservoir sensitivity data with the reservoir sensitivity result located at a lower boundary. The third database can be further divided into a third upper boundary database including reservoir sensitivity data with the reservoir sensitivity result located at an upper boundary, a third intermediate database including reservoir sensitivity data with the reservoir sensitivity result located at an intermediate value, and a third lower boundary database including reservoir sensitivity data with the reservoir sensitivity result located at a lower boundary.

In the embodiments of the present invention, the range of the upper boundary is not less than 0.95 and not greater than 1.00; the range of the lower boundary is not less than 0 and not greater than 0.10; and the range of the intermediate value is greater than 0.10 and less than 0.95. The ranges of the upper boundary, the intermediate value and the lower boundary in the embodiments of the present invention are obtained by multiple tests according to existing data, and can be adjusted as data in the databases is continuously accumulated.

Figure 2:
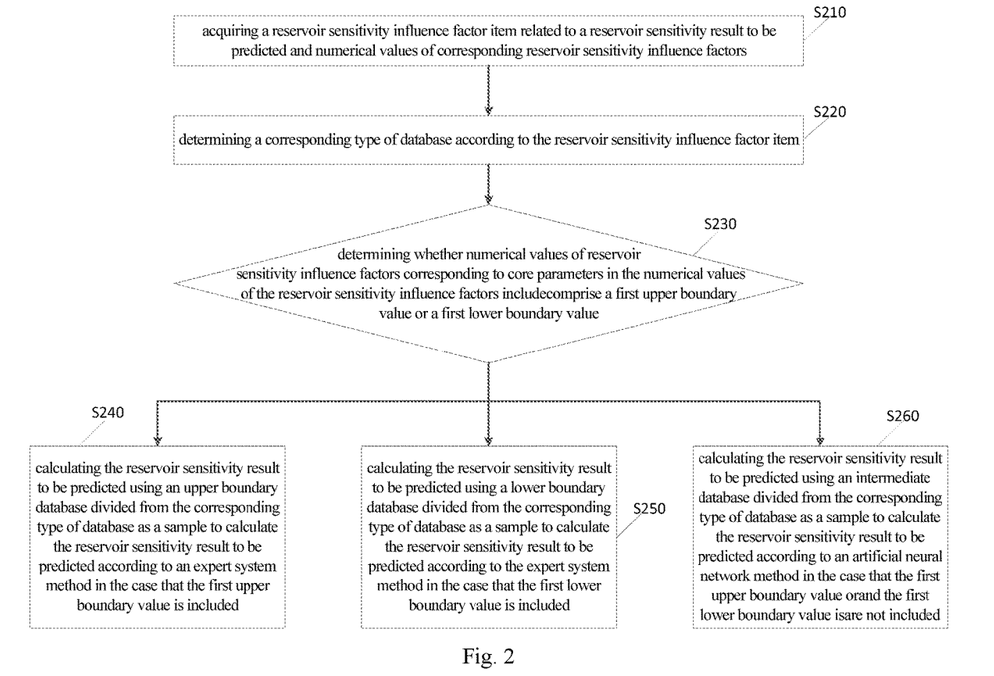
FIG. 2 illustrates a schematic flow diagram of an intelligent prediction method for reservoir sensitivity according to an embodiment of the present invention.

When the intelligent prediction for reservoir sensitivity is performed, differentiated predictions are performed according to the proximity degrees between the reservoir sensitivity influence factors and the boundary values. FIG. 2 illustrates an intelligent prediction method for reservoir sensitivity according to an embodiment of the present invention. As shown in FIG. 2, the embodiment of the present invention provides the intelligent reservoir sensitivity prediction method, including step S210 to step S260.

Step S210, a reservoir sensitivity influence factor item related to a reservoir sensitivity result to be predicted and numerical values of corresponding reservoir sensitivity influence factors are acquired. The reservoir sensitivity influence factor item related to the reservoir sensitivity result to be predicted and the numerical values of the corresponding reservoir sensitivity influence factors can be input by a user.

Step S220, a corresponding type of database is determined according to the reservoir sensitivity influence factor item.

Whether to use the first database, the second database or the third database can be determined according to the reservoir sensitivity influence factor item. For example, the first database can be used if the reservoir sensitivity influence factor item only includes all the core parameters; the second database can be used if the reservoir sensitivity influence factor item includes all the core parameters and at least a part of important parameters; and the third database can be used if the reservoir sensitivity influence factor item includes all the core parameters, all the important parameters and at least a part of auxiliary parameters.

Step S230, whether numerical values of reservoir sensitivity influence factors corresponding to the core parameters in the numerical values of the reservoir sensitivity influence factors include a first upper boundary value or a first lower boundary value is determined.

Optionally, before the determination is performed, the numerical values of the reservoir sensitivity influence factors can be first normalized, and whether the numerical values of the reservoir sensitivity influence factors corresponding to the core parameters in the normalized numerical values of the reservoir sensitivity influence factors include the first upper boundary value or the first lower boundary value is then determined. As mentioned above, for qualitative data, multi-expert assignment and weighted averaging are adopted to perform normalization; and for quantitative data, a numerical value corresponding to the factor is divided by a maximum value of the factor in the corresponding type of database to enable the valuing range to be between 0 and 1.

Optionally, all the core parameters can be considered, and whether the numerical values of the reservoir sensitivity influence factors corresponding to all the core parameters include the first upper boundary value or the first lower boundary value is determined. Or, a preset number of core parameters ranked top after all the core parameters are sorted by importance can be considered according to different actual situations, and whether numerical values of reservoir sensitivity influence factors corresponding to the preset number of core parameters include the first upper boundary value or the first lower boundary value is determined.

In the embodiment of the present invention, the range of the first upper boundary value is not less than 0.90 and not greater than 1.00; and the range of the first lower boundary value is not less than 0 and not greater than 0.05. The ranges of the first upper boundary value and the first lower boundary value in the embodiment of the present invention are obtained by multiple tests according to existing data, and can be adjusted as data in the databases is continuously accumulated.

Step S240, if the first upper boundary value is included, an upper boundary database divided from the corresponding type of database is used as a sample to calculate the reservoir sensitivity result to be predicted according to the expert system method.

Step S250, if the first lower boundary value is included, a lower boundary database divided from the corresponding type of database is used as a sample to calculate the reservoir sensitivity result to be predicted according to the expert system method.

Step S260, if the first upper boundary value and the first lower boundary value are not included, an intermediate database divided from the corresponding type of database is used as a sample to calculate the reservoir sensitivity result to be predicted according to the artificial neural network method.

The expert system method in the embodiment of the present invention includes, but is not limited to, a fuzzy expert system method provided in the literature "Research on a New Method for Forcasting Reservoir Sensitivity" published in 2011 by Jiang Guancheng, Zhang Weixing, Wu Xiongjun, et al. For example, different first intelligent prediction models for reservoir sensitivity can be established in advance respectively according to the first upper boundary database, the second upper boundary database and the third upper boundary database in combination with the expert system method. During execution of the intelligent prediction for reservoir sensitivity, the numerical value of the reservoir sensitivity influence factor related to the reservoir sensitivity result to be predicted is used as an input of the intelligent prediction model for reservoir sensitivity corresponding to the first upper boundary database to calculate and obtain the reservoir sensitivity result to be predicted if it is determined that the intelligent prediction model for reservoir sensitivity corresponding to the first upper boundary database is used. For example, different second intelligent reservoir sensitivity prediction models can be established in advance respectively according to the first lower boundary database, the second lower boundary database and the third lower boundary database in combination with the expert system method. During execution of the intelligent reservoir sensitivity prediction, the numerical value of the reservoir sensitivity influence factor related to the reservoir sensitivity result to be predicted is used as an input of the intelligent prediction model for reservoir sensitivity corresponding to the first lower boundary database to calculate and obtain the reservoir sensitivity result to be predicted if it is determined that the intelligent prediction model for reservoir sensitivity corresponding to the first lower boundary database is used.

The artificial neural network method in the embodiment of the present invention includes, but is not limited to, methods provided in the paper "Optimization of Radial Basis Function Neutral Network and Application in Quantitative Reservoir Sensitivity Prediction" published in 2012 by Wu Xiongjun, Jiang Guancheng, Zhao Lin, et al. For example, different third intelligent reservoir sensitivity prediction models can be established in advance respectively according to the first intermediate database, the second intermediate database and the third intermediate database in combination with the artificial neural network method. During execution of the intelligent prediction for reservoir sensitivity, the numerical value of the reservoir sensitivity influence factor related to the reservoir sensitivity result to be predicted is used as an input of the intelligent reservoir sensitivity prediction model corresponding to the first intermediate database to calculate and obtain the reservoir sensitivity result to be predicted if it is determined that the intelligent prediction model for reservoir sensitivity corresponding to the first intermediate database is used.

Under the condition of sufficient original data, for prediction of reservoir sensitivities with the numerical values of the influence factors within intermediate values, the highest accuracy can be achieved using the artificial neural network. However, for prediction of reservoir sensitivities with the numerical values of the influence factors within boundary values, since it is difficult to effectively guarantee the number of samples for self learning and iteration of the artificial neural network and the test accuracy of learning samples, and the prediction accuracy is low. The expert system method is mainly based on the regularity recognition of field experts. For prediction of reservoir sensitivities taking with the numerical values of their influence factors within the intermediate values, the prediction accuracy of the expert system method is lower than that of the artificial neural network. However, for prediction of reservoir sensitivities with the numerical values of the influence factors within the boundary values, the quantitative prediction accuracy is higher due to more sufficient regularity recognition. Therefore, the two methods can be organically combined to further improve the accuracy of intelligent prediction for reservoir.

Optionally, the predicted reservoir sensitivity result and the numerical value of the reservoir sensitivity influence factor related to the predicted reservoir sensitivity result can be added into the corresponding database as a new sample to further enrich the database. Furthermore, as mentioned above, the new sample in the database can also be tested, and prediction results, obtained by the databases including and not including the reservoir sensitivity data of the new sample, for the numerical value of the tested reservoir sensitivity influence factor are compared. It can be determined that the predicted reservoir sensitivity result and the numerical value of the reservoir sensitivity influence factor related to the predicted reservoir sensitivity result can be added into the database as a new sample if a variation of the prediction accuracy in the two cases is not greater than the preset value.

In the embodiment of the present invention, for situations where numerical values of reservoir sensitivity influence factors, corresponding to core parameters, in numerical values of reservoir sensitivity influence factors related to the reservoir sensitivity result to be predicted have the boundary values and do not have the boundary values, different methods are used to calculate the reservoir sensitivity result to be predicted, that is, different prediction methods are used for performing differentiated treatment according to a proximity degree between the numerical values of the influence factors of a sample to be predicted and the boundary values, thereby effectively improving the accuracy and the range of application of the intelligent reservoir sensitivity prediction method, providing an accurate basis for formulation of reservoir protection measures and enhancing the reservoir protection effect.

One specific example is used to describe the effect of the intelligent prediction method for reservoir sensitivity in the embodiment of the present invention below. In this example, testing the water sensitivity is taken as an example. Sensitivity influence factor items and numerical values corresponding to experimental test values are as shown in Table 2. During execution of specific calculation, the values of the sensitivity influence factors in Table 2 can be firstly normalized.

TABLE 2

| | | Sensitivity influence factor item | | | | | | |
|---|---|---|---|---|---|---|---|---|
| Serial number | Experimental test value | Total content of clay minerals % | Relative content of smectite % | Relative content of illite-smectite formation % | Formation water salinity mg/L | Permeability $10^{-3}\ \mu m^2$ | Porosity % | Formation cementation type |
| 1 | 0.024 | 0.2 | 0 | 2 | 3200 | 0.05 | 2.1 | Weak cementation type |
| 2 | 0.289 | 9.9 | 8 | 5 | 5580 | 2.38 | 8.6 | Thin film-pore type |
| 3 | 0.675 | 16.3 | 24 | 13 | 23716 | 197.36 | 25.3 | Pore type |
| 4 | 0.995 | 18.5 | 42 | 9 | 36993 | 237.95 | 17.2 | Compression type |

The used database is the first database including all the core parameters, and the artificial neural network method and the expert system method are respectively used to perform sensitivity prediction in combination with the first upper boundary database, the first lower boundary database, the first intermediate database and the overall first database. Prediction results are as shown in Table 3 below. The "Lower boundary" in the "Note" column of Table 3 indicates that the first lower boundary database is used (because the normalized influence factors include a lower boundary value), and "Upper boundary" indicates that the first upper boundary database is used (because the normalized influence factors include an upper boundary value).

TABLE 3

| | | | Artificial neural network method | | | | | |
|---|---|---|---|---|---|---|---|---|
| | | | Boundary database | | Intermediate database | | Overall database | |
| Serial number | Note | Experimental test value | Predicted value | Accuracy % | Predicted value | Accuracy % | Predicted value | Accuracy % |
| 1 | Lower boundary | 0.024 | 0.022 | 91.67 | 0.028 | 83.33 | 0.029 | 79.17 |
| 2 | Intermediate value | 0.289 | 0.266 | 92.04 | 0.293 | 98.62 | 0.271 | 93.77 |
| 3 | Intermediate value | 0.675 | 0.617 | 91.41 | 0.688 | 98.07 | 0.631 | 93.48 |
| 4 | Upper boundary | 0.995 | 0.963 | 96.78 | 0.825 | 82.91 | 0.817 | 82.11 |

TABLE 3-continued

|  |  |  | Expert system method | | | | | |
|---|---|---|---|---|---|---|---|---|
|  |  |  | Boundary database | | Intermediate database | | Overall database | |
| Serial number | Note | Experimental test value | Predicted value | Accuracy % | Predicted value | Accuracy % | Predicted value | Accuracy % |
| 1 | Lower boundary | 0.024 | 0.024 | 100.00 | 0.025 | 95.83 | 0.026 | 91.67 |
| 2 | Intermediate value | 0.289 | 0.256 | 88.58 | 0.261 | 90.31 | 0.315 | 91.00 |
| 3 | Intermediate value | 0.675 | 0.607 | 89.93 | 0.598 | 88.59 | 0.693 | 97.33 |
| 4 | Upper boundary | 0.995 | 0.996 | 99.90 | 0.981 | 98.59 | 0.968 | 97.29 |

It can be seen from the predictions of the test samples with known sensitivity results that for the test samples having actual sensitivity results within the boundary values, the expert system method is adopted to be combined with the boundary databases for prediction, so that the accuracy is the highest; and for the test samples having actual sensitivity results within the intermediate values, the artificial neural network method is adopted to be combined with the intermediate databases for prediction, so that the accuracy is the highest. It can be seen from the overall prediction results that for the test samples having actual sensitivity results within the boundary values, the accuracy is higher when in prediction by adopting the expert system method; and for the test samples having actual sensitivity results within the intermediate values, the accuracy is higher when in prediction by adopting the artificial neural network method. In addition, during prediction by either the artificial neural network method or the expert system method, the closer the database used is to a sample to be tested, the higher the accuracy is higher.

Figure 3:
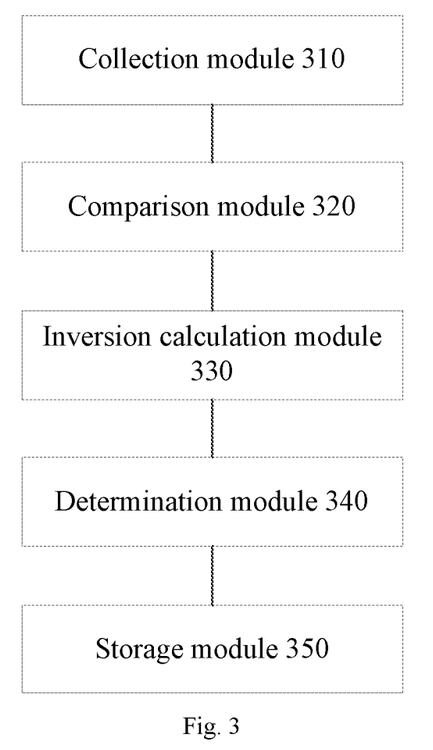
FIG. 3 illustrates a structural block diagram of an intelligent prediction data processing apparatus for reservoir sensitivity according to an embodiment of the present invention.

FIG. 3 illustrates a structural block diagram of an intelligent prediction data processing apparatus for reservoir sensitivity according to an embodiment of the present invention. As shown in FIG. 3, the embodiment of the present invention further provides an intelligent prediction data processing apparatus for reservoir sensitivity. The apparatus can include a collection module 310 used for collecting reservoir sensitivity data which includes a new reservoir sensitivity influence factor item, numerical values of new reservoir sensitivity influence factors and a new reservoir sensitivity result; a comparison module 320 used for comparing the new reservoir sensitivity factor item with a standard reservoir sensitivity factor item to obtain a comparison result; an inversion calculation module 330 used for performing inversion calculation to obtain a numerical value of a missing reservoir sensitivity influence factor in the case that the comparison result indicates that one reservoir sensitivity influence factor is missing in the new reservoir sensitivity factor item; a determination module 340 used for determining whether the numerical value of the missing reservoir sensitivity influence factor obtained by inversion calculation is accurate; and a storage module 350 used for storing the numerical value of the missing reservoir sensitivity influence factor obtained by inversion calculation, the numerical values of the new reservoir sensitivity influence factors and the new reservoir sensitivity result in a corresponding database as one piece of new reservoir sensitivity data in the case that the numerical value of the missing reservoir sensitivity influence factor obtained by inversion calculation is accurate.

In some optional embodiments, the determination module is used for determining whether the numerical value of the missing reservoir sensitivity influence factor obtained by inversion calculation is accurate according to the following steps: a first reservoir sensitivity result is obtained according to a first reservoir sensitivity prediction model generated by using a database that does not include the piece of new reservoir sensitivity data as a sample, and a numerical value of a tested reservoir sensitivity factor; a second reservoir sensitivity result is obtained according to a second reservoir sensitivity prediction model generated by using a database that includes the piece of new reservoir sensitivity data as a sample, and the numerical value of the tested reservoir sensitivity factor; a first prediction accuracy of the first reservoir sensitivity result compared to an actual reservoir sensitivity result corresponding to the numerical value of the tested reservoir sensitivity factor is calculated; a second prediction accuracy of the second reservoir sensitivity result compared to the actual reservoir sensitivity result corresponding to the numerical value of the tested reservoir sensitivity factor is calculated; and it is determined that the numerical value of the missing reservoir sensitivity influence factor is accurate in the case that an absolute value of a difference value between the second prediction accuracy and the first prediction accuracy is not greater than a preset value.

In some optional embodiments, the apparatus further includes a test module used for testing one piece of specific reservoir sensitivity data in the database, including that: a third reservoir sensitivity result is obtained according to a third reservoir sensitivity prediction model generated by using a database that does not include the piece of specific reservoir sensitivity data as a sample, and a numerical value of a tested reservoir sensitivity factor; a fourth reservoir sensitivity result is obtained according to a fourth reservoir sensitivity prediction model generated by using a database that includes the piece of specific reservoir sensitivity data as a sample, and the numerical value of the tested reservoir sensitivity factor; a third prediction accuracy of the third reservoir sensitivity result compared to the actual reservoir sensitivity result corresponding to the numerical value of the tested reservoir sensitivity factor is calculated; a fourth prediction accuracy of the fourth reservoir sensitivity result compared to the actual reservoir sensitivity result corresponding to the numerical value of the tested reservoir sensitivity factor is calculated; in the case that an absolute value of a difference value between the third prediction accuracy and the fourth prediction accuracy is greater than a preset value, it is determined that the piece of specific reservoir sensitivity data is abnormal, and the piece of specific reservoir sensitivity data is deleted; and in the case that the absolute value of the difference value between the third prediction accuracy and the fourth prediction accuracy is not greater than the preset value, it is determined that the piece of specific reservoir sensitivity data is normal. The piece of specific reservoir sensitivity data is any one piece of reservoir sensitivity data in the database.

The specific working principle and benefits of the intelligent prediction data processing apparatus for reservoir sensitivity provided by the embodiment of the present invention are the same as those of the intelligent prediction data processing method for reservoir sensitivity provided by the above embodiment of the present invention, which will not be described in detail here.

The intelligent prediction data processing apparatus for reservoir sensitivity can include a processor and a memory. The above-mentioned modules and the like are used as program units to be stored in the memory. The processor executes the program units stored in the memory to realize corresponding functions.

The processor includes a kernel which calls the corresponding program units from the memory. One or more kernels can be set. The intelligent reservoir data processing method for sensitivity prediction provided by the embodiment of the present invention can be implemented by adjusting kernel parameters.

The memory may include a volatile memory, a random access memory (RAM) and/or a non-volatile memory in a computer-readable medium, and other forms, such as a read-only memory (ROM) or a flash RAM. The memory includes at least one storage chip.

Figure 4:
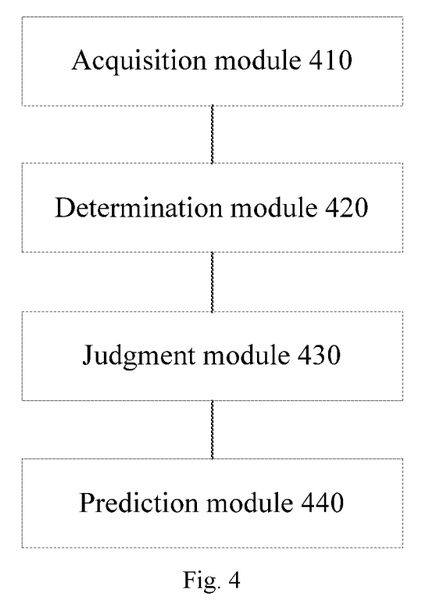
FIG. 4 illustrates a structural block diagram of an intelligent prediction apparatus for reservoir sensitivity according to an embodiment of the present invention.

FIG. 4 illustrates a structural block diagram of an intelligent prediction apparatus for reservoir sensitivity according to an embodiment of the present invention. As shown in FIG. 4, the embodiment of the present invention further provides an intelligent prediction apparatus for reservoir sensitivity. The apparatus can include an acquisition module 410 used for acquiring a reservoir sensitivity influence factor item related to a reservoir sensitivity result to be predicted and numerical values of corresponding reservoir sensitivity influence factors; a determination module 420 used for determining a corresponding type of database according to the reservoir sensitivity influence factor item; a judgment module 430 used for determining whether numerical values of reservoir sensitivity influence factors corresponding to the core parameters in the numerical values of the reservoir sensitivity influence factors include a first upper boundary value or a first lower boundary value; and a prediction module 440 used for taking an upper boundary database divided from the corresponding type of database as a sample to calculate the reservoir sensitivity result to be predicted according to the expert system method if the first upper boundary value is included; taking a lower boundary database divided from the corresponding type of database as a sample to calculate the reservoir sensitivity result to be predicted according to the expert system method if the first lower boundary value is included; and taking an intermediate database divided from the corresponding type of database as a sample to calculate the reservoir sensitivity result to be predicted according to the artificial neural network method if the first upper boundary value and the first lower boundary value are not included.

In some optional embodiments, the judgment module can first normalize the numerical values of the reservoir sensitivity influence factors, and then determine whether the numerical values of the reservoir sensitivity influence factors corresponding to the core parameters in the normalized numerical values of the reservoir sensitivity influence factors include the first upper boundary value or the first lower boundary value.

The specific working principle and benefits of the intelligent prediction apparatus for reservoir sensitivity provided by the embodiment of the present invention are the same as those of the intelligent prediction method for reservoir sensitivity in the above embodiments of the present invention, which will not be described in detail here.

The intelligent prediction apparatus for reservoir sensitivity can include a processor and a memory. The above-mentioned modules and the like are used as program units to be stored in the memory.

The processor executes the above program units stored in the memory to realize corresponding functions.

The processor includes a kernel which calls the corresponding program units from the memory. One or more kernels can be set. The intelligent prediction method for reservoir sensitivity in the embodiment of the present invention can be implemented by adjusting kernel parameters.

The memory may include a volatile memory, a random access memory (RAM) and/or a non-volatile memory in a computer-readable medium, and other forms, such as ROM or a flash RAM. The memory includes at least one storage chip.

An embodiment of the present invention also provides a machine-readable storage medium which stores instructions. The instructions enable a machine to execute the intelligent prediction data processing method for reservoir sensitivity according to any embodiment of the present invention and/or the intelligent prediction method for reservoir sensitivity according to any embodiment of the present invention.

An embodiment of the present invention provides a processor used for operating programs. The programs, when running, execute the intelligent reservoir data processing method for reservoir sensitivity according to any embodiment of the present invention and/or the intelligent prediction method for reservoir sensitivity according to any embodiment of the present invention.

An embodiment of the present invention provides a device which includes a processor, a memory, and programs that are stored on the memory and run on the processor. The processor executes the programs to realize the intelligent prediction data processing method for reservoir sensitivity according to any embodiment of the present invention and/or the intelligent prediction method for reservoir sensitivity according to any embodiment of the present invention.

Those skilled in the art should understand that the embodiments of the present application may be provided as methods, systems or computer program products. Therefore, the present application may adopt the form of a complete hardware embodiment, a complete software embodiment, or a software and hardware combined embodiment. In addition, the present application may adopt the form of a computer program product implemented on one or more computer-usable storage media (including, but not limited to, a magnetic disk memory, a compact disc read-only memory (CD-ROM), an optical memory and the like) including computer-usable program codes.

The present application is described by referring to flow diagrams and/or block diagrams of methods, devices (systems) and computer program products according to the embodiments of the present application. It should be understood that computer program instructions may implement each flow and/or each block in the flow diagrams and/or block diagrams and combination of the flows and/or the blocks in the flow diagrams and/or the block diagrams.

These computer program instructions may be provided for a general computer, a dedicated computer, an embedded processor or processors of other programmable data processing devices to generate a machine, thereby making the instructions that are executed by the computer or the processors of other programmable data processing devices generate an apparatus for realizing specified functions in one or multiple flows of the flow diagrams and/or one or multiple blocks of the block diagrams.

These computer program instructions also may be stored in a computer-readable memory capable of guiding the computer or other programmable data processing devices to work in a specific manner, thereby making the instructions that are stored in the computer-readable memory generate manufactured products that include instruction apparatuses. The instruction apparatuses realize the specified functions in one or multiple flows of the flow diagrams and/or one or multiple blocks of the block diagrams.

These computer program instructions also may be loaded onto a computer or other programmable data processing devices to execute a series of operation steps on the computer or other programmable data processing devices to generate processing implemented by the computer, so that the instructions executed on the computer or other programmable data processing devices provide steps for realizing the specified functions in one or multiple flows of the flow diagrams and/or one or multiple blocks of the block diagrams.

In one typical configuration, a computing device includes one or more processors (or CPUs), an input/output interface, a network interface and an internal memory.

The memory may include a volatile memory, an RAM and/or a non-volatile memory in a computer-readable medium, and other forms, such as an ROM or a flash RAM. The memory is an example of the compute-readable medium.

Computer-readable media include non-volatile and volatile, removable and non-removable media which may realize information storage by any method or technology. The information can be computer-readable instructions, data structures, program modules, or other data. Examples of computer storage media include, but are not limited to, a phase change random access memory (PRAM), a static random access memory (SRAM), a dynamic random access memory (DRAM), other types of RAMs, an ROM, an electrically erasable programmable read-only memory (EEPROM), a flash memory or other memory technologies, a compact disk read only memory (CD-ROM), a digital versatile disc (DVD) or other optical storages, a magnetic cassette, a magnetic tape magnetic disk storage or other magnetic storage devices or any other non-transmission media, and can be used to store information that can be accessed by computing devices. According to the definition herein, the computer-readable media do not include transitory media, such as modulated data signals and carrier waves.

It also should be noted that terms "include", "comprise" or any other variants thereof are intended to cover non-exclusive inclusions, so that a process, method, commodity or device that includes a series of elements not only includes those elements, but also includes other elements which are not definitely listed, or further includes inherent elements of this process, method, commodity or device. Elements defined by a statement "includes a/an . . . " do not exclude that the process, method, commodity or device that includes the elements still includes other identical elements without more restrictions.

The above contents are only the embodiments of the present application, but are not intended to limit the present invention. Those skilled in the art can make various changes and modifications to the present application. Any modifications, equivalent replacements, improvements and the like that are made within the spirit and the principle of the present application shall all fall within the scope of claims of the present application.

The invention claimed is:

1. A method for exploiting oil and gas resources with improved protection effect of oil and gas reservoirs, comprising:
    acquiring a reservoir sensitivity influence factor item and numerical values of corresponding reservoir sensitivity influence factors related to the oil and gas reservoirs;
    determining a corresponding type of database according to the reservoir sensitivity influence factor item;
    determining whether numerical values of reservoir sensitivity influence factors corresponding to core parameters in the numerical values of the reservoir sensitivity influence factors include a first upper boundary value or a first lower boundary value;
    inputting the numerical values of reservoir sensitivity influence factors into a first intelligent prediction model to obtain a reservoir sensitivity result of the oil and gas reservoirs when the first upper boundary value is included, wherein the first intelligent prediction model is pre-established according to an expert system method using an upper boundary database divided from the corresponding type of database as a sample;
    inputting the numerical values of reservoir sensitivity influence factors into a second intelligent prediction model to obtain a reservoir sensitivity result of the oil and gas reservoirs when the first lower boundary value is included, wherein the second intelligent prediction model is pre-established according to the expert system method using a lower boundary database divided from the corresponding type of database as the sample; and
    inputting the numerical values of reservoir sensitivity influence factors into a third intelligent prediction model to obtain a reservoir sensitivity result of the oil and gas reservoirs when the first upper boundary value and the first lower boundary value both are not included, wherein the third intelligent prediction model is pre-established according to an artificial neural network method using an intermediate database divided from the corresponding type of database as the sample;
    formulating protection measures of the oil and gas reservoirs according to the reservoir sensitivity result of the oil and gas reservoirs;
    exploiting the oil and gas resources wherein the protection effect of the oil and gas reservoirs is improved by the protection measures.

2. The method according to claim 1, wherein:
    the corresponding type of database comprises: a first database including all core parameters; a second database including all the core parameters and at least a part of important parameters; and a third database including all the core parameters, all important parameters, and at least a part of auxiliary parameters;
    the first database is divided into a first upper boundary database including reservoir sensitivity data with a reservoir sensitivity result located within an upper boundary, a first intermediate database including reservoir sensitivity data with a reservoir sensitivity result located within an intermediate value, and a first lower boundary database including reservoir sensitivity data with a reservoir sensitivity result located within a lower boundary;

the second database is divided into a second upper boundary database including reservoir sensitivity data with a reservoir sensitivity result located within the upper boundary, a second intermediate database including reservoir sensitivity data with a reservoir sensitivity result located within the intermediate value, and a second lower boundary database including reservoir sensitivity data with a reservoir sensitivity result located within the lower boundary; and the third database is divided into a third upper boundary database including reservoir sensitivity data with a reservoir sensitivity result located within the upper boundary, a third intermediate database including reservoir sensitivity data with a reservoir sensitivity result located within the intermediate value, and a third lower boundary database including reservoir sensitivity data with a reservoir sensitivity result located within the lower boundary.

3. The method according to claim 2, wherein the first database, the second database or the third database is used as follows: when new reservoir sensitivity data is collected, and a reservoir sensitivity result in the new reservoir sensitivity data is known and one reservoir sensitivity influence factor is missing relative to one of the first database, the second database or the third database, the one of the first database, the second database or the third database is used to perform inversion calculation to obtain a numerical value of the missing reservoir sensitivity influence factor, wherein the numerical value of the missing reservoir sensitivity influence factor obtained by inversion calculation and the new reservoir sensitivity data are stored in the one of the first database, the second database or the third database as one piece of new reservoir sensitivity data.

4. The method according to claim 2, wherein a range of the upper boundary is not less than 0.95 and not greater than 1.00; a range of the lower boundary is not less than 0 and not greater than 0.10; and a range of the intermediate value is greater than 0.10 and less than 0.95.

5. The method according to claim 1, wherein the determining whether the numerical values of the reservoir sensitivity influence factors corresponding to the core parameters in the numerical values of the reservoir sensitivity influence factors comprise the first upper boundary value or the first lower boundary value comprises:

normalizing the numerical values of the reservoir sensitivity influence factors; and determining whether the numerical values of the reservoir sensitivity influence factors corresponding to the core parameters in the numerical values of the reservoir sensitivity influence factors comprise the first upper boundary value or the first lower boundary value.

6. The method according to claim 1, wherein a range of the first upper boundary value is not less than 0.90 and not greater than 1.00; and a range of the first lower boundary value is not less than 0 and not greater than 0.05.

7. The method according to claim 1, wherein the database is established in advance according to the following steps:

collecting reservoir sensitivity data, wherein the reservoir sensitivity data comprises a new reservoir sensitivity influence factor item, new numerical values of reservoir sensitivity influence factors and a new reservoir sensitivity result;

comparing the new reservoir sensitivity factor item with a standard reservoir sensitivity factor item to obtain a comparison result;

performing inversion calculation to obtain a numerical value of the missing reservoir sensitivity influence factor, when the comparison result indicates that one reservoir sensitivity influence factor is missing in the new reservoir sensitivity factor item;

determining whether the numerical value of the missing reservoir sensitivity influence factor obtained by inversion calculation is accurate by:

obtaining a first reservoir sensitivity result according to a first reservoir sensitivity prediction model generated by using a database that does not comprise the piece of new reservoir sensitivity data as a sample, and numerical values of tested reservoir sensitivity factors;

obtaining a second reservoir sensitivity result according to a second reservoir sensitivity prediction model generated by using a database that comprises the piece of new reservoir sensitivity data as a sample, and the numerical values of the tested reservoir sensitivity factors;

calculating a first prediction accuracy of the first reservoir sensitivity result compared to an actual reservoir sensitivity result corresponding to the numerical values of the tested reservoir sensitivity factors;

calculating a second prediction accuracy of the second reservoir sensitivity result compared to the actual reservoir sensitivity result corresponding to the numerical values of the tested reservoir sensitivity factors; and determining that the numerical value of the missing reservoir sensitivity influence factor is accurate when an absolute value of a difference value between the second prediction accuracy and the first prediction accuracy is not greater than a preset value;

storing the numerical value of the missing reservoir sensitivity influence factor obtained by inversion calculation, the new numerical values of reservoir sensitivity influence factors and the new reservoir sensitivity result in the corresponding database as one piece of new reservoir sensitivity data, when the numerical value of the missing reservoir sensitivity influence factor obtained by inversion calculation is accurate.

8. The method according to claim 7, wherein the steps used to establish the database further comprises testing one piece of specific reservoir sensitivity data in the database, which comprises:

obtaining a third reservoir sensitivity result according to a third reservoir sensitivity prediction model generated by using a database that does not comprise the piece of specific reservoir sensitivity data as a sample, and numerical values of tested reservoir sensitivity factors;

obtaining a fourth reservoir sensitivity result according to a fourth reservoir sensitivity prediction model generated by using a database that comprises the piece of specific reservoir sensitivity data as a sample, and the numerical values of the tested reservoir sensitivity factors;

calculating a third prediction accuracy of the third reservoir sensitivity result compared to the actual reservoir sensitivity result corresponding to the numerical values of the tested reservoir sensitivity factors;

calculating a fourth prediction accuracy of the fourth reservoir sensitivity result compared to the actual reservoir sensitivity result corresponding to the numerical values of the tested reservoir sensitivity factors; and when an absolute value of a difference value between the third prediction accuracy and the fourth prediction accuracy is greater than a preset value, determining that the piece of specific reservoir sensitivity data is abnormal, and deleting the piece of specific reservoir sensitivity data; and when the absolute value of the difference value between the third prediction accuracy and the fourth prediction accuracy is not greater than the preset value, determining that the piece of specific reservoir sensitivity data is normal, wherein the piece of specific reservoir sensitivity data is any one piece of reservoir sensitivity data in the database.

9. The method according to claim 7, wherein after the step of collecting the reservoir sensitivity data, and before the step of comparing the new reservoir sensitivity factor item with the standard reservoir sensitivity factor item to obtain the comparison result, the steps used to establish the database further comprise:

normalizing the numerical value of the new reservoir sensitivity influence factor.

10. An apparatus for formulating protection measures of oil and gas reservoirs for exploiting oil and gas resources, comprising a memory and a processor, wherein the memory stores instructions that are used to enable the processor to execute the following steps:

acquiring a reservoir sensitivity influence factor item and numerical values of corresponding reservoir sensitivity influence factors related to the oil and gas reservoirs;

determining a corresponding type of database according to the reservoir sensitivity influence factor item;

determining whether numerical values of reservoir sensitivity influence factors corresponding to core parameters in the numerical values of the reservoir sensitivity influence factors include a first upper boundary value or a first lower boundary value;

inputting the numerical values of reservoir sensitivity influence factors into a first intelligent prediction model to obtain a reservoir sensitivity result of the oil and gas reservoirs when the first upper boundary value is included, wherein the first intelligent prediction model is pre-established according to an expert system method using an upper boundary database divided from the corresponding type of database as a sample;

inputting the numerical values of reservoir sensitivity influence factors into a second intelligent prediction model to obtain a reservoir sensitivity result of the oil and gas reservoirs when the first lower boundary value is included, wherein the second intelligent prediction model is pre-established according to the expert system method using a lower boundary database divided from the corresponding type of database as the sample; and inputting the numerical values of reservoir sensitivity influence factors into a third intelligent prediction model to obtain a reservoir sensitivity result of the oil and gas reservoirs when the first upper boundary value and the first lower boundary value both are not included, wherein the third intelligent prediction model is pre-established according to an artificial neural network method using an intermediate database divided from the corresponding type of database as the sample;

formulating protection measures of the oil and gas reservoirs according to the reservoir sensitivity result of the oil and gas reservoirs;

exploiting the oil and gas resources wherein the protection effect of the oil and gas reservoirs is improved by the protection measures.

11. The apparatus according to claim 10, wherein:

the corresponding type of database comprises: a first database including all core parameters; a second database including all the core parameters and at least a part of important parameters; and a third database including all the core parameters, all important parameters, and at least a part of auxiliary parameters;

the first database is divided into a first upper boundary database including reservoir sensitivity data with a reservoir sensitivity result located within an upper boundary, a first intermediate database including reservoir sensitivity data with a reservoir sensitivity result located within an intermediate value, and a first lower boundary database including reservoir sensitivity data with a reservoir sensitivity result located within a lower boundary;

the second database is divided into a second upper boundary database including reservoir sensitivity data with a reservoir sensitivity result located within the upper boundary, a second intermediate database including reservoir sensitivity data with a reservoir sensitivity result located within the intermediate value, and a second lower boundary database including reservoir sensitivity data with a reservoir sensitivity result located within the lower boundary; and the third database is divided into a third upper boundary database including reservoir sensitivity data with a reservoir sensitivity result located within the upper boundary, a third intermediate database including reservoir sensitivity data with a reservoir sensitivity result located within the intermediate value, and a third lower boundary database including reservoir sensitivity data with a reservoir sensitivity result located within the lower boundary.

12. The apparatus according to claim 10, wherein the first database, the second database or the third database is used as follows: when new reservoir sensitivity data is collected, and a reservoir sensitivity result in the new reservoir sensitivity data is known and one reservoir sensitivity influence factor is missing relative to one of the first database, the second database or the third database, the one of the first database, the second database or the third database is used to perform inversion calculation to obtain a numerical value of the missing reservoir sensitivity influence factor, wherein the numerical value of the missing reservoir sensitivity influence factor obtained by inversion calculation and the new reservoir sensitivity data are stored in the one of the first database, the second database or the third database as one piece of new reservoir sensitivity data.

13. The apparatus according to claim 11, wherein a range of the upper boundary is not less than 0.95 and not greater than 1.00; a range of the lower boundary is not less than 0 and not greater than 0.10; and a range of the intermediate value is greater than 0.10 and less than 0.95.

14. The method according to claim 10, wherein the determining whether the numerical values of the reservoir sensitivity influence factors corresponding to the core parameters in the numerical values of the reservoir sensitivity influence factors comprise the first upper boundary value or the first lower boundary value comprises:

normalizing the numerical values of the reservoir sensitivity influence factors; and determining whether the numerical values of the reservoir sensitivity influence factors corresponding to the core parameters in the numerical values of the reservoir sensitivity influence factors comprise the first upper boundary value or the first lower boundary value.

15. The apparatus according to claim 10, wherein a range of the first upper boundary value is not less than 0.90 and not greater than 1.00; and a range of the first lower boundary value is not less than 0 and not greater than 0.05.

16. The apparatus according to claim 10, wherein the database is established in advance according to the following steps:
   collecting reservoir sensitivity data, wherein the reservoir sensitivity data comprises a new reservoir sensitivity influence factor item, new numerical values of reservoir sensitivity influence factors and a new reservoir sensitivity result;
   comparing the new reservoir sensitivity factor item with a standard reservoir sensitivity factor item to obtain a comparison result;
   performing inversion calculation to obtain a numerical value of the missing reservoir sensitivity influence factor, when the comparison result indicates that one reservoir sensitivity influence factor is missing in the new reservoir sensitivity factor item;
   determining whether the numerical value of the missing reservoir sensitivity influence factor obtained by inversion calculation is accurate by:
      obtaining a first reservoir sensitivity result according to a first reservoir sensitivity prediction model generated by using a database that does not comprise the piece of new reservoir sensitivity data as a sample, and numerical values of tested reservoir sensitivity factors;
      obtaining a second reservoir sensitivity result according to a second reservoir sensitivity prediction model generated by using a database that comprises the piece of new reservoir sensitivity data as a sample, and the numerical values of the tested reservoir sensitivity factors;
      calculating a first prediction accuracy of the first reservoir sensitivity result compared to an actual reservoir sensitivity result corresponding to the numerical values of the tested reservoir sensitivity factors;
      calculating a second prediction accuracy of the second reservoir sensitivity result compared to the actual reservoir sensitivity result corresponding to the numerical values of the tested reservoir sensitivity factors; and
      determining that the numerical value of the missing reservoir sensitivity influence factor is accurate when an absolute value of a difference value between the second prediction accuracy and the first prediction accuracy is not greater than a preset value;
   storing the numerical value of the missing reservoir sensitivity influence factor obtained by inversion calculation, the new numerical values of reservoir sensitivity influence factors and the new reservoir sensitivity result in the corresponding database as one piece of new reservoir sensitivity data, when the numerical value of the missing reservoir sensitivity influence factor obtained by inversion calculation is accurate.

17. The apparatus according to claim 16, wherein the steps used to establish the database further comprises testing one piece of specific reservoir sensitivity data in the database, which comprises:
   obtaining a third reservoir sensitivity result according to a third reservoir sensitivity prediction model generated by using a database that does not comprise the piece of specific reservoir sensitivity data as a sample, and numerical values of tested reservoir sensitivity factors;
   obtaining a fourth reservoir sensitivity result according to a fourth reservoir sensitivity prediction model generated by using a database that comprises the piece of specific reservoir sensitivity data as a sample, and the numerical values of the tested reservoir sensitivity factors;
   calculating a third prediction accuracy of the third reservoir sensitivity result compared to the actual reservoir sensitivity result corresponding to the numerical values of the tested reservoir sensitivity factors;
   calculating a fourth prediction accuracy of the fourth reservoir sensitivity result compared to the actual reservoir sensitivity result corresponding to the numerical values of the tested reservoir sensitivity factors; and
   when an absolute value of a difference value between the third prediction accuracy and the fourth prediction accuracy is greater than a preset value, determining that the piece of specific reservoir sensitivity data is abnormal, and deleting the piece of specific reservoir sensitivity data; and
   when the absolute value of the difference value between the third prediction accuracy and the fourth prediction accuracy is not greater than the preset value, determining that the piece of specific reservoir sensitivity data is normal,
   wherein the piece of specific reservoir sensitivity data is any one piece of reservoir sensitivity data in the database.

18. The apparatus according to claim 16, wherein after the step of collecting the reservoir sensitivity data, and before the step of comparing the new reservoir sensitivity factor item with the standard reservoir sensitivity factor item to obtain the comparison result, the steps used to establish the database further comprises:
   normalizing the numerical value of the new reservoir sensitivity influence factor.

* * * * *